(12) United States Patent
Kempf

(10) Patent No.: US 6,810,649 B2
(45) Date of Patent: Nov. 2, 2004

(54) DRIVE SYSTEM FOR A CROP PROCESSING DEVICE AND FOR A CROP TRANSPORT DEVICE OF A HARVESTING MACHINE

(75) Inventor: Bernd Kempf, Althornbach (DE)

(73) Assignee: Deere & Company, Moline, IL (US)

( * ) Notice: Subject to any disclaimer, the term of this patent is extended or adjusted under 35 U.S.C. 154(b) by 8 days.

(21) Appl. No.: 10/369,799

(22) Filed: Feb. 19, 2003

(65) Prior Publication Data

US 2003/0159419 A1 Aug. 28, 2003

(30) Foreign Application Priority Data

Feb. 22, 2002 (DE) .......................... 102 07 467

(51) Int. Cl.[7] .............................................. A01D 69/03
(52) U.S. Cl. ................................. 56/16.4 R; 56/16.4 A
(58) Field of Search .............................. 56/16.4 R, 1, 2, 56/16.9, 10.2 C, 10.2 R, 10.2 G, 16.4 B, 16.4 A, 119, 53, 94, 504; 198/835, 604, 624, 789; 241/101.742, 605

(56) References Cited

U.S. PATENT DOCUMENTS

| 3,959,953 A | 6/1976 | Garrott ........................ 56/10.2 |
| 4,009,556 A | 3/1977 | Molzahn ...................... 56/10.7 |
| 4,788,813 A | 12/1988 | Strosser et al. ............. 56/10.32 |
| 6,052,978 A | 4/2000 | Kempf ......................... 56/119 |
| 6,152,827 A | 11/2000 | Müller et al. | |

FOREIGN PATENT DOCUMENTS

| DE | 33 44 043 A1 | 6/1985 |
| DE | 35 32 000 A1 | 3/1987 |
| DE | 36 01 355 A1 | 7/1987 |
| DE | 198 39 154 C | 6/2000 |
| DE | 199 12 407 A1 | 9/2000 |
| DE | 298 24 502 U 1 | 5/2001 |
| EP | 0 680 687 | 11/1995 |
| EP | 1 180 322 | 2/2002 |
| GB | 2 169 366 | 7/1986 |
| WO | WO 01 65919 | 9/2001 |

*Primary Examiner*—Robert E Pezzuto

(57) ABSTRACT

A drive system for a crop processing device and for a crop transport device of a forage harvester, can be operated at least in a first operational mode and in a second operational mode. In the first operational mode, the crop processing device is driven by a first drive power supplying device, and at least part of the drive power is made available to the crop transport device by a second drive power supplying device. The second drive power supplying device is a reversible, variable speed device and is solely coupled to the crop processing device when the drive system is in a second operational mode. In order to prevent a movement of the crop transport device in the second operational mode, in which, e.g., the crop processing device can be worked with a sharpening device, a stop device is suggested that stops the crop transport device in the second operational mode.

12 Claims, 3 Drawing Sheets

DRIVE SYSTEM FOR A CROP PROCESSING DEVICE AND FOR A CROP TRANSPORT DEVICE OF A HARVESTING MACHINE

FIELD OF THE INVENTION

The invention pertains to a drive system for a crop processing device and for a crop transport device of a harvesting machine, which system can be operated at least in a first operational mode and in a second operational mode. In the first operational mode, the crop processing device is driven by a first drive power supplying device and at least part of the drive power is made available to the crop transport device by a second drive power supplying device so that the crop transport device supplies crop to the crop processing device and the crop processing device is driven in the second operational mode by the second drive power supplying device.

BACKGROUND OF THE INVENTION

U.S. Pat. No. 6,052,978 describes a drive system for the feed rollers and the chopper drum of a forage harvester. During the harvesting operation the chopper drum is mechanically driven. The mechanical drive is also connected to the sun gear of a planetary transmission. The ring gear of the planetary transmission is driven by a hydraulic motor and the planet gear carriers are connected to the feed rollers. As a result, the speed of the feed rollers and the associated cut length can be infinitely adjusted by varying the speed of the hydraulic motor. The planetary transmission can be blocked in itself in order to pass through only the torque of the hydraulic motor to the feed rollers or to the chopper drum. As a result, the chopper drum can be slid backwards or forwards. However, the known drive system has the disadvantage that the feed rollers are permanently driven by the hydraulic motor, that is, even during sharpening.

In other conventional forage harvesters, a switchable transmission is used for the drive of the feed rollers and the driven elements of the crop take-up device. This transmission is brought manually into a neutral position before sharpening, which causes great complexity, since the driver must climb out of his cab and go to the transmission that is located in the vicinity of the crop feed conduit.

The invention has the basic problem of making available an improved drive system in which the disadvantages cited above are not present.

SUMMARY OF THE INVENTION

According to the present invention, there is provided an improved drive arrangement for the crop feed and processing elements of a harvesting machine.

The invention is relative to a drive system of a crop processing device and of a crop feed or transport device of a harvesting machine that can be operated at least in a first and in a second operational mode. In the first operational mode, a first drive power supplying device, as a rule an internal combustion engine, drives the crop processing device directly or indirectly, that is, via intercalated mechanical transmissions or other power transfer devices such as hydrostatic transmissions. At least part of the drive power is made available to the crop transport device feeding crop to the crop processing device in the first operational mode by a second drive power supplying device. In the second operational mode that is used, e.g., for sharpening the crop processing device with a changed speed or direction of rotation, the second drive power supplying device drives the crop processing device. In order to prevent a rotation of the crop transport device in the second operational mode, the invention suggests that a stop device block a rotation of the crop transport device in the second operational mode.

In this manner, the second drive power supplying device is used for two tasks, namely, in the first operational mode for driving the crop transport device, and in the second operational mode for driving the crop processing device; however, an undesired rotation of the crop processing device is avoided in the second operational mode.

The second drive power supplying device preferably comprises a separate motor. A hydraulic motor is preferably used, although an electric motor can also be used. An embodiment of a motor with changeable initial speed makes it possible to adjust the transport speed of the transport device that influences the cut length achieved in a forage harvester.

It is also basically conceivable that the motor of the second drive power supplying device produce the entire drive power for the transport device. However, in order to be able to use a less powerful, and thus smaller and more economical motor, it is preferred to allow the drive power to be made available to the transport device at least partially also from the first drive power supplying device A planetary transmission or another superposed transmission can be used thereby that is coupled to the motor and, in the first operational mode, to the first drive power supplying device. The speed of the crop transport device can be adjusted with the planetary transmission in the first operational mode by varying the speed of the motor. It is meaningful in such an embodiment to block the planetary transmission in itself in the second operational mode, e.g., by establishing a rigid connection between the sun gear and the planet-gear carrier in order to pass through the drive power of the motor to the crop processing device, that for its part is separate from the first drive power supplying device. However, a separate drive train can also be used in the second operational mode between the motor and the crop processing device.

There is the possibility of not only stopping the crop transport device in the second operational mode, but also of separating it from the second drive power supplying device. The stop device can, as is known in cutoff couplings of metal detectors, separate the drive first, and shortly thereafter in time, stop the crop transport device. In a preferred embodiment, a clutch coupling is used that can be activated in the first operational mode by a first element controlled by a metal detector. Furthermore, a second element is provided that activates the clutch coupling in the second operational mode. The first and/or second element(s) is/are preferably also used to stop the transport device. To this end, conventional stop latches can be used that engage cog wheels that are cogged in a sawtoothed manner and are arranged on a shaft that drives the transport device.

In the second operational mode, even the driven elements of a crop pickup device can be stopped by putting a shifting transmission associated with them in neutral.

Note that the stop device and the other controllable elements cited are, as a rule, not brought individually and manually by the operator of the harvesting machine by switches into their positions associated with the particular operational modes, but rather, are regulated electronically or electromechanically by a control connected, for its part, to an input device preferably located in a cab. The operator selects the first, second or any other operational mode desired in the input device and the control brings about the described activation of the controllable elements.

BRIEF DESCRIPTION OF THE DRAWINGS

The drawings show an exemplary embodiment of the invention that is described in detail in the following.

DESCRIPTION OF THE PREFERRED EMBODIMENT

Figure 1:
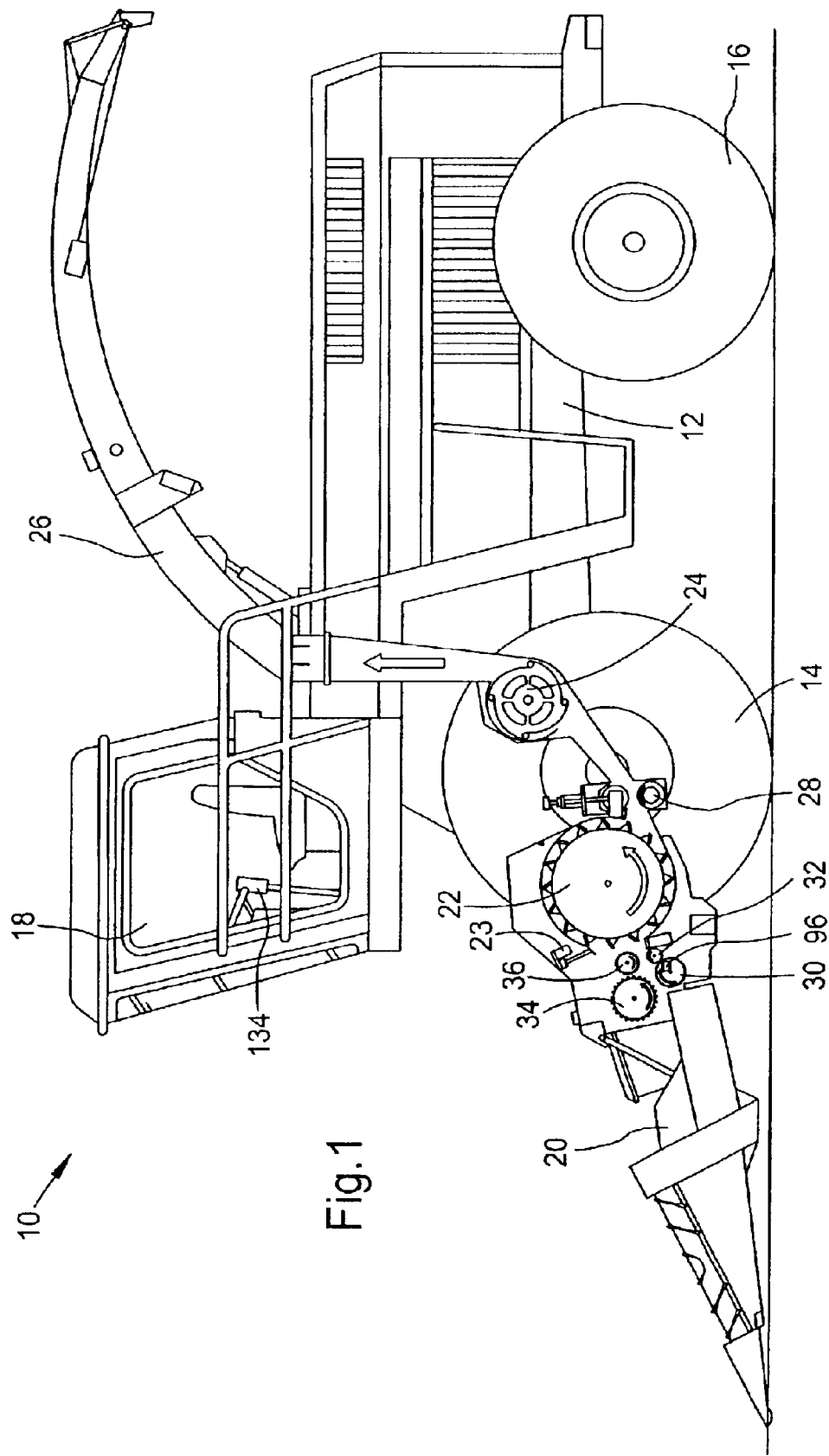
FIG. 1 is a schematic left side elevational view of a harvesting machine with which the present invention is particularly adapted for use.

A harvesting machine 10, shown in FIG. 1 in the form of a self-propelled forage harvester, includes a frame 12 carried by driven front wheels 14 and steerable rear wheels 16. The control of the operation of harvesting machine 10 takes place from driver cab 18 from which a crop pickup device 20 can be viewed. Crop, e.g., corn, grass or the like, taken up from the ground by the crop pickup device 20 is fed by lower feed rollers 30, 32 and upper feed rollers 34, 36, arranged in a feed or draw-in conduit of harvesting machine 10, to a chopper drum 22 provided as a crop processing device that chops the crop into small pieces and gives it to a transport device 24, in the form of a blower impeller. Feed rollers 30–36 serve as a crop transport or feed device. As a rule, upper feed rollers 34, 36 are arranged so that they can be moved relative to lower feed rollers 30, 32 and are pressed towards the latter by spring power. The crop leaves the harvesting machine 10 to a trailer moving alongside via a discharge chute 26 that is mounted for swiveling about an upright axis. A kernel processor device 28, including two superposed processing rollers, is positioned between the chopper drum 22 and the transport device 24, and tangentially feeds the crop to the transport device 24. Chopper drum 22 is associated with a sharpening device 23 that includes a sharpening stone with which the knives of the chopper drum 22 can be sharpened.

Figure 2:
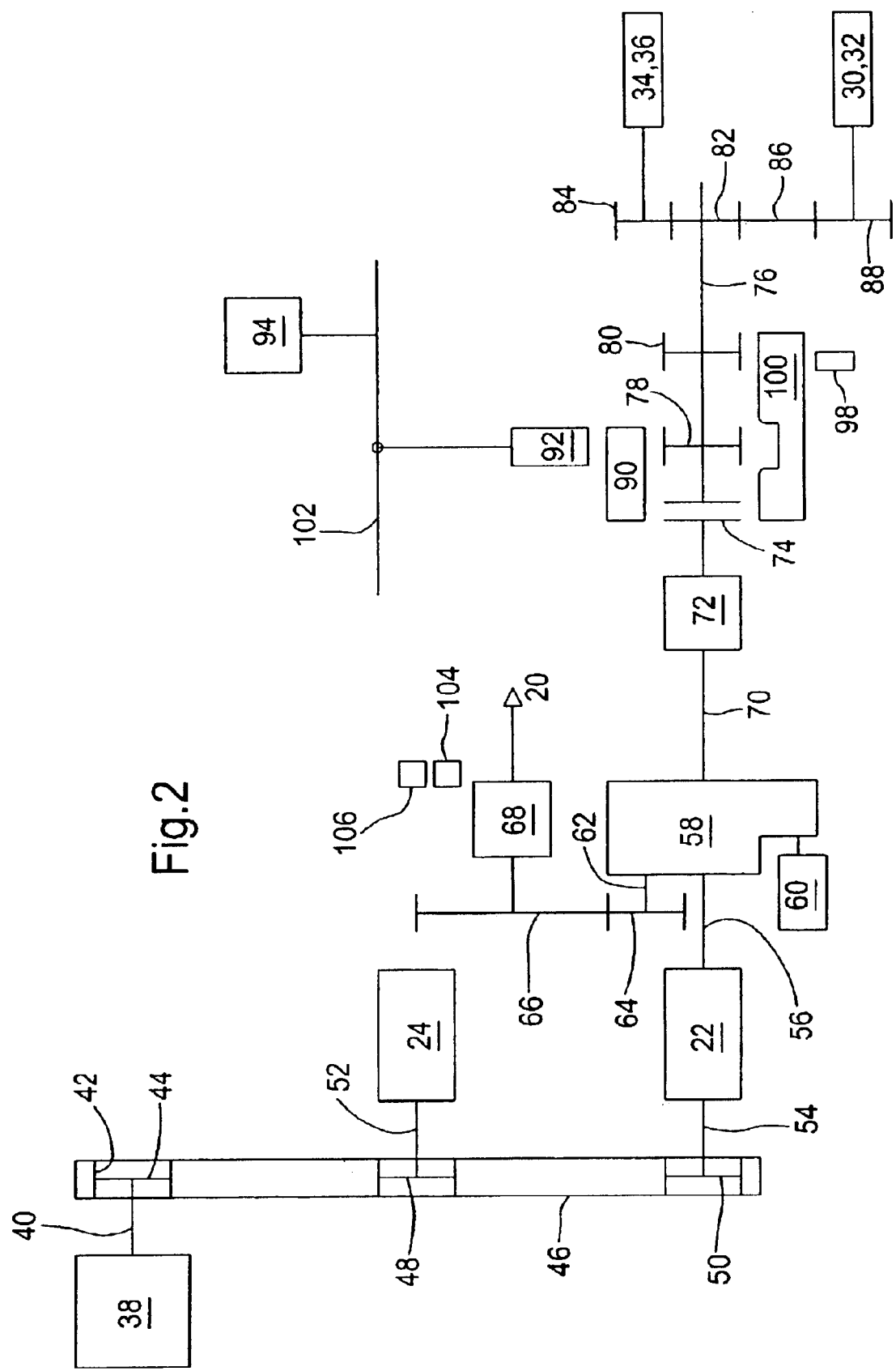
FIG. 2 is a schematic representation of the drive system of the crop transport elements and crop processing elements of the harvesting machine constructed in accordance with the principles of the present invention.

FIG. 2 shows the elements of the drive system of the crop processing elements and crop transport elements individually. An internal combustion engine 38, that as a rule, runs at a constant speed and is fastened to frame 12 above the rear wheels 16, serves as the first drive power supplying device and produces a drive torque. Hydraulic motors associated with driven front wheels 14 can be driven via a hydraulic pump (not shown) in order to be able to move the harvesting machine 10 over a field or a road.

Output shaft 40 of the internal combustion engine 38 drives a first belt pulley 42 via an electric clutch or coupling 44 that can be engaged and disengaged. The electric coupling 44 is arranged in the inside space of the first belt pulley 42. The first belt pulley 42 is engaged with a drive belt 46, which also engages a second belt pulley 48 and a third belt pulley 50. As a rule, tensioning devices are associated with the drive belt 46. Instead of the electric coupling 44, a belt tensioning device that can be moved into engagement with, and disengagement from, the belt 46 could be used in order to selectively establish or disengage the drive connection between the drive belt 46 and the internal combustion engine 38. The second belt pulley 48 is coupled, via shaft 52, to the rotor of the transport device 24. The third belt pulley 50 is coupled, via another shaft 54, to the chopper drum 22.

Chopper drum 22 is connected in a torque-proof manner on its side opposite shaft 54 to another shaft 56 that is coupled to an adjustable transmission 58. The transmission 58 is shown in detail in FIG. 3 and is described further below in detail. Furthermore, the transmission 58 is connected to a hydraulic motor 60, to a driven shaft 62, with which the driven elements of the crop pickup device 20 are connected via gears 64, 66 and shift transmission 68, as well as to an output shaft 70. The hydraulic motor 60 functions as a second drive power supplying device for the feed rollers 30–36 and the chopper drum 22. The output shaft 70 is driven by the transmission 58 and is connected, via stepup gearing 72, to a clutch coupling 74 designed as a slip coupling that is coupled on the driven side to a shaft 76 on which a first toothed cog wheel 78, with radially placed active surfaces, and a second toothed cog wheel 80, with radially placed active surfaces, are arranged in a torque-proof manner and spaced axially relative to one another. The second cog wheel 80 is offset by 180° relative to the first cog wheel 78. Moreover, the shaft 76 is connected in a driving connection, via gears 82, 84, 86, and 88, to the upper feed rollers 34, 36 and to the lower feed rollers 30, 32, which rotate in the opposite direction from said upper feed rollers.

The clutch coupling 74 and the first cog wheel 78 are associated with an electromagnetically movable locking cam 90. In its activated position, the locking cam 90 effects the opening of the first clutch coupling 74, and shortly thereafter, the locking cam 90 engages into cog wheel 78 in order to stop it. A control surface of the clutch coupling 74 can be moved by a surface of the locking cam 90 arranged obliquely to the direction of rotation against the force of a spring, which has the consequence that two frictional surfaces of the clutch coupling 74, of which one is in a driving connection with stepup gearing 72 and one is in a driving connection with shaft 76, are moved axially apart from one another and come out of engagement. Subsequently, an appropriate surface of the locking cam 90 comes into engagement with the active surface of cog wheel 78 and stops it. An embodiment like the one known from DE 33 44 043 A1, DE 35 32 000 A1 or DE 36 01 355 A1 is preferably used for the locking cam 90, clutch coupling 74 and cog wheel 78, the disclosure of which embodiment is taken up by reference to it in the present protective right. Any other embodiment can also be used as a clutch coupling, e.g., a shiftable claw coupling like the one disclosed in U.S. Pat. No. 6,152,827, DE 298 24 502 U or DE 198 39 154 C. Locking cam 90 can be moved by solenoid 92 between its activated position and its rest position. Solenoid 92 is connected, via bus 102, to a control 94 that is connected to the electric coupling 44 and to a metal detector 96, that is arranged in the lower front draw-in roller 30 and is designed to detect ferromagnetic materials in the crop flow drawn in. Such a metal detector is known, e.g., from U.S. Pat. No. 4,788,813, DE 199 12 407 A and U.S. Pat. No. 3,959,953 and the references cited there. The locking cam 90 and the first cog wheel 78 are designed to interrupt the rotation of the shaft 76 when the latter rotates in a first direction corresponding to the normal chopping operation.

A second locking cam 100 is associated with the second toothed cog wheel 80, which cam can be moved by a solenoid 98 between its rest position and its activated position, in which it at first opens clutch coupling 74 and then engages into the second, toothed cog wheel 80 and stops it. The second locking cam 100 is arranged staggered at an angle relative to the first locking cam 90. It is shaped in such a manner that it does not cooperate with the first cog wheel 78. To this end, an appropriate recess can be provided in the second locking cam 100. The solenoid 98 is likewise connected, via bus 102, to the control 94. The second locking cam 100 and second cog wheel 80 are designed to prevent a rotation of the shaft 76 when the latter rotates in a second direction opposite to the first direction. The design and mode of operation of the locking cam 100 agree in essence with that of first locking cam 90, only it can be operated in a direction of rotation of the shaft 76 counter to the direction of rotation in which the first locking cam 90 can be operated.

The shift transmission 68, which is used to drive crop pickup device 20, can be shifted by a hydraulic cylinder 104 into one of three positions: namely, a first position in which a first gear ratio is effective between the input and the output of shift transmission 68; a second position in which a second gear ratio is effective; and a third (neutral) position in which no driving torque is made available. The hydraulic cylinder 104 is controlled by a solenoid valve device 106 connected for its part, via bus 102, to the electronic control 94. The shift transmission 68 thus makes it possible to selectively drive or disengage the driven elements of the crop pickup device 20 with a first or a second speed.

Figure 3:
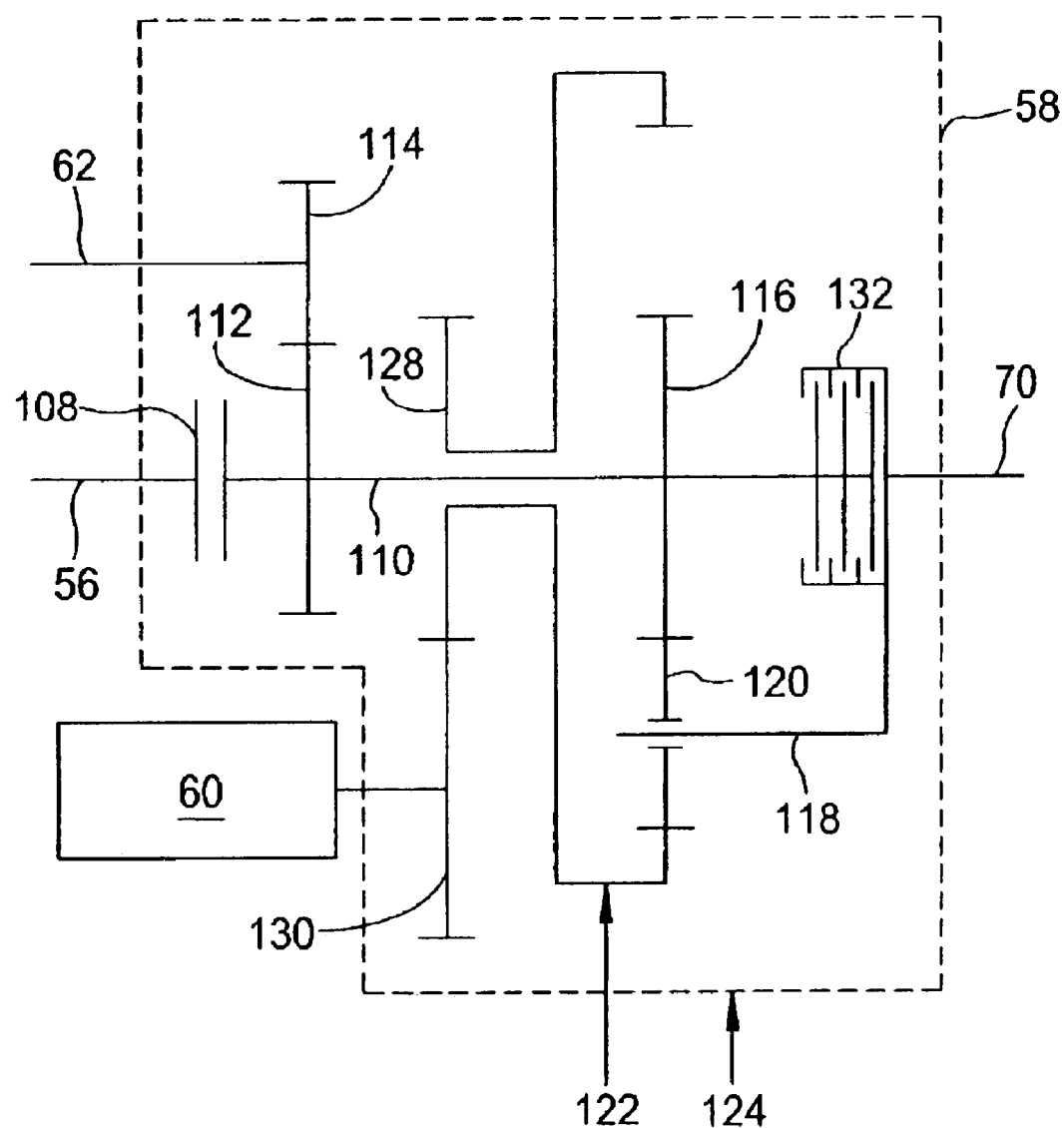
FIG. 3 is a schematic representation of the adjustable transmission of the drive system shown in FIG. 2.

The adjustable transmission 58 is shown in detail in FIG. 3. The shaft 56, serving as an output of the chopper drum 22, is connected to a disengageable coupling 108. On the output side, the coupling 108 is connected to a shaft 110 that, via meshing gears 112 and 114, drives the driven shaft 62, which is coupled to the crop pickup device 20. The driving torque made available from the chopper drum 22 is thus passed through transmission 58 to the shift transmission 68 by fixed gearing. However, in another embodiment, the shaft 62 could also be coupled to the output shaft 70 in order to make possible an infinite adjustment of the working speed of the driven elements of crop pickup device 20.

The part of the adjustable transmission 58 leading to the output shaft 70 is designed as a planetary transmission including a sun gear 116, a planet-gear carrier 118 with planet gears 120, a ring gear 122, and a housing 124. The sun gear 116 is connected to the shaft 110 in such a manner that it rotates in unison with it, and the shaft 110, in a not-shown manner, is rotatably supported in the housing 124, as are the ring gear 122 and the planet-gear carrier 118. The shaft 110 extends through a central area of the ring gear 122. The hydraulic motor 60 is driven by a hydraulic pump driven directly or indirectly by the internal combustion engine 38, and its speed is variable. The speed adjustment can take place in various traditional manners by reducing or increasing the transported amount of fluid. An electric motor can also be used instead of the hydraulic motor 60.

The planet-gear carrier 118 is put in rotation by the planet gears 120 on the one hand, and on the other hand, is connected to the output shaft 70. The planet gears 120 roll between the sun gear 116 and the ring gear 122 on the planet-gear carrier 118, during which the direction of rotation and the speed are adjusted relative to one another in accordance with the ratio of the speeds of the sun gear 116 and the ring gear 122. Three planet gears 120 are provided in the preferred exemplary embodiment; however, this number can be more or less. The ring gear 122 receives the planet gears 120, the planet-gear carrier 118 and the sun gear 116 in its interior and is provided in its closed area with a gear 128 and is connected to it in such a manner that it rotates in unison with it. This gear 128 meshes with a gear 130 that is driven by the hydraulic motor 60 or is located on its output shaft. The adjustable transmission 58 includes another coupling 132 connected to the planet-gear carrier 118 in such a manner that it rotates in unison with it and is thus also connected on the output side to the output shaft 70. On the other hand, this coupling 132 can establish a connection to the shaft 110 and the sun gear 116. In this manner, the entire transmission 58 can be blocked in itself. The additional coupling 132 can be activated electromagnetically by the control 94.

In another embodiment, the adjustable transmission 58 is also designed as a planetary transmission; however, shaft 110 is connected to the ring gear 122, and the gear 130 of hydraulic motor 60 drives the sun gear 116. In other operational modes (e.g., reversing and knife sharpening) in which only hydraulic motor 60 makes available drive power for the crop transport device, the ring gear 122 is held fast. The advantage is that, as a consequence, the gearing of the planetary transmission is utilized. The drive power from the hydraulic motor 60 can then be transferred, if necessary, via other drive elements onto the crop processing device.

The drive system described and shown in the drawings makes possible an operation in different operational modes that can be selected by input devices 134 arranged in the cab 18 in the range of the driver, attached to the top of a driving lever, and connected to the control 94. Specifically, this concerns, in particular, a first operational mode in which a crop operation takes place, a second operational mode in which the knives of the chopper drum 22 are sharpened, and a third operational mode in which a reverse operation takes place. Other operational modes such as road travel and neutral are of course possible.

In the first operational mode, in which plants are picked up from a field by the crop pickup device 20, chopped by chopper drum 22 and ejected through discharge chute 26, internal combustion motor 38 is running and electric coupling 44 is brought into the coupled state by control 94 appropriately controlled by input devices 134. Internal combustion engine 38 puts the transport device 24 and the chopper drum 22 in rotation via drive belt 46. The chopper drum 22 drives shaft 110 in adjustable transmission 58 via other shaft 56 and coupling 108 that is engaged in the first operational mode. Shaft 110 drives the driven elements of crop pickup device 20 via meshing gear pair 112, 114, gears 64, 66, and shift transmission 68. The speed of crop pickup device 20 can be selected in two stages by an input into input device 134 by means of control 94, solenoid valve device 106, hydraulic cylinder 104, and shift transmission 68.

Furthermore, shaft 110 drives sun gear 116. Hydraulic motor 60 drives ring gear 122 via meshing gears 128, 130 with a speed that can be varied by means of input device 134. The other coupling 132 is decoupled in the first operational mode by control 94. The planetary transmission makes a variable speed available to output shaft 70. Output shaft 70 drives feed rollers 30–36 via gearing transmission 72, coupled clutch coupling 74, and gears 82–88. Thus, the transport speed of feed rollers 30–36 can be varied by adjusting the speed of hydraulic motor 60. It defines the cut length of the crop chopped by chopper drum 22.

Metal detector 96 is activated in the first operational mode. If it detects metal penetrating into the draw-in conduit that could result in damage to chopper drum 22 or to other elements of harvesting machine 10, electric coupling 44 is cut out via control 94 and solenoid 98 is activated at the same time. The latter moves locking cam 90 into the stop position so that clutch coupling 74 is decoupled and shortly thereafter first cog wheel 78 is stopped. Feed rollers 30–36 are thus stopped before undesired matter reaches chopper drum 22. The control 94 can also bring shift transmission 68 into the neutral position by means of the hydraulic cylinder 104 in order to stop the driven elements of the crop pickup device. After removal of the foreign material, the first operational mode can be reentered The second operational mode serves to sharpen the knives of chopper drum 22. Upon an appropriate input of the operator in cab 18 into input devices 134, control 94 brings about a decoupling of electric coupling 44 and a coupling of the other coupling 132. The planetary transmission of adjustable transmission 58 is thus blocked in itself. Coupling 108 is engaged. Hydraulic motor 60 (driven in the same direction as in the first operational mode) produces a rotary movement on output shaft 70 and on shaft 110, that rotates in the opposite direction of the rotary movement in the first operational mode. Chopper drum 22 is therefore rotated through hydraulic motor 60 in a direction opposite the direction in the first operational mode. Sharpening device 23 is then activated manually or automatically by appropriate actuators. The retrograde rotation of chopper drum 22 during the sharpening of its knives makes an improved sharpening quality possible.

In the second operational mode, a drive of the driven elements of crop pickup device 20 is not desired. Therefore, in the second operational mode, control 94 brings about, via solenoid valve device 106, that hydraulic cylinder 104 brings shift transmission 68 into the neutral position. The driving torque of hydraulic motor 60 is thus not passed through to crop pickup device 20.

Even feed rollers 30–36 are stopped in the second operational mode. To this end, control 94 activates second locking cam 100 via solenoid 98, which cam brings about a decoupling of clutch coupling 74. The second locking cam 100 engages immediately thereafter into second cog wheel 80 which is active in the current direction of rotation and stops it. This stops feed rollers 30–36. It is also conceivable in another embodiment that the second solenoid 98 activates an altered locking cam that only cooperates with the second cog wheel 80 while first solenoid 92 disengages clutch coupling 74 via first locking cam 90.

Note that another operational mode for sharpening the knives of chopper drum 22 is also possible in which chopper drum 22 rotates in the direction in which it also rotates in the first operational mode. Electric coupling 44 is then separated, shift transmission 68 brought into the neutral position, hydraulic motor 60 driven counter to the direction of rotation cited above and solenoid 92 activated, that separates clutch coupling 74 via first locking cam 90 and stops first cog wheel 78.

The third operational mode, the reverse operation, makes it possible to eliminate cloggings in crop pickup device 20 or in harvesting machine 10. Upon an appropriate input into input devices 134, control 94 brings about that electric coupling 44, and disengageable coupling 108 are decoupled. The other coupling 132 is brought by the control into a coupled state. The planetary transmission of adjustable transmission 58 is thus also blocked in itself. Hydraulic motor 60 produces a rotary movement on output shaft 70 and on shaft 110 that rotates counter to the rotary movement in the first operational mode. Then, only hydraulic motor 60 drives the driven elements of crop pickup device 20 via shaft 110 and drives feed rollers 30–36 via output shaft 70 and coupled clutch coupling 74. Coupling 108, disengaged in the third operational mode, prevents hydraulic motor 60 from having to supply a driving torque for rotating the chopper drum 22 and the transport device 24. The reversed rotation direction of rotation of the feed rollers 30–36 ejects any cloggings or foreign matter detected by metal detector 96. Note that an operation is also possible by driving hydraulic motor 60 in the opposite direction of rotation in which operation the cited elements are slowly driven in a direction in which they draw the crop in. Such other operational mode can be useful for eliminating cloggings.

Having described the preferred embodiment, it will become apparent that various modifications can be made without departing from the scope of the invention as defined in the accompanying claims.

What is claimed is:

1. In a forage harvester including a driven crop pickup device, a driven crop processing device, a driven crop transport device located for receiving crop from said pickup device and for feeding such crop to the crop processing and a drive system coupled for driving said crop processing and crop transport devices and including first and second drive power supplying devices operational in a first mode of operation to effect driving of said crop processing device by said first drive power supplying device and for effecting driving of said crop transport device by a combination of said first and second power supplying devices, and operational in a second mode of operation to effect driving of said crop processing device solely by said second drive power supplying device, the improvement comprising: said drive system further including a drive stop device coupled to said crop transport device; and a control device connected to said drive stop device for causing it to stop the crop transport device when said drive system is in said second operational mode.

2. The forage harvester, as defined in claim 1, wherein said second drive power supplying device is a variable speed, reversible drive power supplying device, whereby said crop processing device may be driven in said second operational mode at a different speed and/or direction of rotation than in said first operational mode.

3. The forage harvester, as defined in claim 1, wherein said first drive power supplying device is an internal combustion engine coupled to said crop processing device.

4. The forage harvester, as defined in claim 1, and further including a sharpening device associated with said crop processing device; and said control device being coupled to said sharpening device to activate the same when said drive system is in said second operational mode.

5. The forage harvester, as defined in claim 1, wherein said second drive power supplying device comprises a hydraulic motor.

6. The forage harvester, as defined in claim 5, wherein said second drive train includes a planetary transmission coupled to said hydraulic motor and in said first operational mode to said first drive power supplying device.

7. The forage harvester, as defined in claim 6, wherein a third drive train is connected between said planetary transmission and said crop processing device and includes a selectively engagable drive coupling; and said drive coupling being engaged during said second operational mode so that the torque of said hydraulic motor can be passed through by the planetary transmission to the crop processing device, which is separated in the second operational mode from the first drive power supplying device.

8. The forage harvester, as defined in claim 1, wherein a second selectively engagable coupling is provided between said second drive power supplying device and said crop transport device for separating said crop transport device from said second drive power supplying device when said drive system is in said second operational mode.

9. The forage harvester, as defined in claim 8, wherein said stop device includes a decoupling device and can be operated to first separate the second drive power supplying device from the crop transport device and thereafter to stop the crop transport device.

10. The forage harvester, as defined in claim 9, wherein said decoupling device is a clutch coupling provided for connecting and separating the crop transport device to and from the second drive power supplying device; said control device including a first element coupled for effecting disengagement of said clutch coupling in response to said control device receiving a trip signal from a metal detector, and further including a second element coupled for effecting disengagement of said clutch coupling in response to said drive system being placed in said second operational mode.

11. The forage harvester, as defined in claim 10, wherein said first and second elements and said crop transport device are constructed such that said first and second elements also act to stop said crop transport device when said first and second elements are operated for effecting disengagement of said clutch coupling.

12. The forage harvester, as defined in claim 1, wherein said drive system includes a shift transmission located for delivering power to said driven crop pickup device; a shift controller coupled to said shift transmission; and said control device being coupled to said shift controller and operable to automatically shift said shift transmission into a neutral condition in response to said drive system being placed in said second operational mode.

* * * * *